US012807828B2

(12) United States Patent
Sun et al.

(10) Patent No.: US 12,807,828 B2

(45) Date of Patent: Nov. 24, 2026

(54) STABILIZING AQUEOUS INKJET INK COMPOSITIONS

(71) Applicant: Xerox Corporation, Norwalk, CT (US)

(72) Inventors: Jing X. Sun, Lexington, KY (US); Nienwen Chow, Rochester, NY (US); David M. Skinner, Rochester, NY (US); Peter V. Nguyen, Webster, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 751 days.

(21) Appl. No.: 18/325,326

(22) Filed: May 30, 2023

(65) Prior Publication Data

US 2024/0400846 A1 Dec. 5, 2024

(51) Int. Cl.

| | |
|---|---|
| ***C09D 11/322*** | (2014.01) |
| ***C09D 11/023*** | (2014.01) |
| ***C09D 11/033*** | (2014.01) |
| ***C09D 11/107*** | (2014.01) |

(52) U.S. Cl.

CPC .......... *C09D 11/322* (2013.01); *C09D 11/023* (2013.01); *C09D 11/033* (2013.01); *C09D 11/107* (2013.01)

(58) Field of Classification Search

CPC ... C09D 11/322; C09D 11/023; C09D 11/033; C09D 11/107

See application file for complete search history.

(56) References Cited

U.S. PATENT DOCUMENTS

| | | | |
|---|---|---|---|
| 4,923,919 | A | 5/1990 | Frazee |
| 5,461,103 | A | 10/1995 | Bafford et al. |
| 6,433,091 | B1 | 8/2002 | Cheng |
| 8,328,927 | B2 | 12/2012 | Aoyama et al. |
| 8,728,455 | B2 | 5/2014 | Konradi et al. |
| 9,090,736 | B2 | 7/2015 | Schwalm et al. |
| 9,234,110 | B2 | 1/2016 | Katoh et al. |
| 9,359,522 | B2 | 6/2016 | Matsuyama et al. |
| 9,371,464 | B2 | 6/2016 | Breton et al. |
| 9,862,788 | B2 | 1/2018 | Hilf et al. |
| 9,963,592 | B2 | 5/2018 | Burns et al. |
| 10,968,358 | B2 | 4/2021 | Kunii et al. |
| 2006/0038867 | A1 | 2/2006 | Valentini |
| 2008/0186373 | A1 | 8/2008 | Rolly |
| 2010/0075044 | A1 | 3/2010 | Kato et al. |
| 2011/0012955 | A1 | 1/2011 | Tom et al. |
| 2011/0318551 | A1 | 12/2011 | Nakagawa |
| 2016/0122597 | A1 | 5/2016 | Xiao et al. |
| 2018/0056691 | A1* | 3/2018 | Arai ..................... C09D 11/101 |
| 2018/0371260 | A1 | 12/2018 | Wu |
| 2019/0367753 | A1 | 12/2019 | Chopra et al. |
| 2021/0222025 | A1 | 7/2021 | Okazaki et al. |
| 2022/0162349 | A1 | 5/2022 | Tehrani et al. |
| 2022/0162461 | A1 | 5/2022 | Tehrani et al. |
| 2022/0380586 | A1 | 12/2022 | Lu et al. |
| 2023/0046647 | A1 | 2/2023 | Moffat et al. |
| 2023/0051056 | A1 | 2/2023 | Moffat et al. |
| 2023/0053177 | A1 | 2/2023 | Tehrani |
| 2023/0055456 | A1 | 2/2023 | Tehrani |
| 2023/0073050 | A1 | 3/2023 | Duquenne et al. |
| 2023/0100354 | A1 | 3/2023 | Moffat et al. |
| 2023/0183403 | A1 | 6/2023 | Tehrani |
| 2023/0183503 | A1 | 6/2023 | Tehrani et al. |
| 2023/0212412 | A1* | 7/2023 | Masatoki .................. B41J 2/01 347/100 |

FOREIGN PATENT DOCUMENTS

| | | | |
|---|---|---|---|
| EP | 1609827 | A1 | 12/2005 |
| EP | 1108758 | B1 | 7/2006 |
| EP | 2823002 | B1 | 5/2016 |
| EP | 2285920 | | 9/2016 |
| EP | 1756237 | B1 | 5/2017 |
| EP | 3000853 | B1 | 4/2020 |
| EP | 3494182 | B1 | 4/2020 |
| KR | 20160077982 | A | 7/2016 |
| WO | WO2014/042653 | | 3/2014 |
| WO | WO2015091318 | | 6/2015 |
| WO | WO2018/087287 | A1 | 5/2018 |
| WO | WO2018/143957 | | 8/2018 |
| WO | WO2018/143959 | | 8/2018 |
| WO | WO2018/143962 | | 8/2018 |
| WO | WO2018/158436 | A1 | 9/2018 |
| WO | WO2021136721 | | 7/2021 |

OTHER PUBLICATIONS

Evonik launches VISIOMER® GLYFOMA, a low-odor reactive diluent—Evonik PDF press release, available from web as of Jul. 13, 2021 at https://methyl-methacrylate-monomers.evonik.com/en/evonik-launches-visiomer-glyfoma-a-low-odor-reactive-diluent-96754.html.

* cited by examiner

*Primary Examiner* — Jiangtian Xu

(74) *Attorney, Agent, or Firm* — MH2 TECHNOLOGY LAW GROUP LLP

(57) ABSTRACT

Aqueous inkjet ink compositions are provided which comprise water, a co-medium, pigment particles, and resin particles, wherein the resin particles comprise a polymerization product of reactants comprising: one or more types of hydrophobic monomers; and one or more types of anionic monomers comprising one or more types of crosslinkable anionic monomers.

17 Claims, No Drawings

STABILIZING AQUEOUS INKJET INK COMPOSITIONS

BACKGROUND

Latexes have been used in aqueous inkjet ink compositions in order to bind colorants in the compositions to substrates and to protect printed images. Aggregation of solids (including colorants) in aqueous inkjet ink compositions is a pervasive problem since it can lead to jetting instability and nozzle clogging. Sometimes dispersants are used in aqueous inkjet ink compositions to disperse colorants, but other components of the compositions, e.g., humectants, can interfere with these dispersants leading to aggregation. Moreover, the problem of aggregation is often exacerbated by latexes added to the aqueous inkjet ink compositions since they can also interfere with colorant dispersibility. In addition, the latexes increase the solid content of the aqueous inkjet ink compositions, leading to jetting instability and nozzle clogging.

SUMMARY

The present disclosure provides aqueous inkjet ink compositions comprising water, a co-medium, pigment particles, and resin particles. The resin particles are polymerized from hydrophobic monomers and anionic monomers, including crosslinkable anionic monomers. When embodiments of the resin particles are incorporated into the aqueous inkjet ink compositions, the inks are highly stable as evidenced by minimal changes in particle size after extended storage times at elevated temperatures (e.g., 21 days at 60° C.). Moreover, such stability is achieved under a range of challenging conditions that tend to induce pigment particle agglomeration, e.g., using polymer dispersed pigment particles, relatively large pigment particles, relatively large amounts of pigment particles, relatively small amounts of the resin particles, and relatively large amounts of humectants, including 1,2-hexanediol. The latexes comprising water and the resin particles are also provided.

By "inkjet" in "aqueous inkjet ink composition" it is meant that the composition is printable, i.e., jettable, by an inkjet printing system, including a piezoelectric inkjet printing system configured to eject droplets of the aqueous inkjet ink composition onto an underlying substrate by oscillations of piezoelectric vibrating elements.

As used herein, "room temperature" refers to a temperature of from about 20° C. to about 25° C.

In one aspect, an aqueous inkjet ink composition is provided. In an embodiment, such a composition comprises water, a co-medium, pigment particles, and resin particles, wherein the resin particles comprise a polymerization product of reactants comprising: one or more types of hydrophobic monomers; and one or more types of anionic monomers comprising one or more types of crosslinkable anionic monomers.

In another embodiment, an aqueous inkjet ink composition comprises water, a co-medium, dispersed pigment particles, and resin particles, wherein the resin particles comprise a polymerization product of reactants comprising: one or more types of hydrophobic monomers; and one or more types of anionic monomers comprising one or more types of crosslinkable anionic monomers, wherein a total amount of polymerized crosslinkable anionic monomers in the resin particles is at least about 1 weight % and a total amount of polymerized anionic monomers in the resin particles is at least about 15 weight %.

In another aspect, a latex is provided. In an embodiment, such a latex comprises water and resin particles, wherein the resin particles comprise a polymerization product of reactants comprising: one or more types of hydrophobic monomers; and one or more types of anionic monomers comprising one or more types of crosslinkable anionic monomers, wherein a total amount of polymerized crosslinkable anionic monomers in the resin particles is at least about 1 weight % and a total amount of polymerized anionic monomers in the resin particles is at least about 15 weight %.

Other principal features and advantages of the disclosure will become apparent to those skilled in the art upon review of the following drawings, the detailed description, and the appended claims.

DETAILED DESCRIPTION

Resin Particles

The aqueous inkjet ink compositions comprise water, a co-medium, pigment particles, and resin particles. The resin particles are synthesized from various monomers, forming a polymeric material from which the resin particles are composed. Hydrophobic monomers are used to form the resin particles. Being hydrophobic, the hydrophobic monomers have limited solubility/miscibility in water, e.g., a room temperature solubility in water of 0.1 g/L to 3 g/L. However, in embodiments, hydrophobic monomers having a room temperature solubility of less than 0.1 g/L are not used. Various hydrophobic monomers may be used such as styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; phenyl acrylate, methyl alphachloroacrylate; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. (Throughout the present disclosure, the use of "(meth)" as in, e.g., "(meth)acrylate", refers to both acrylate and methacrylate.)

A single type or combinations of different types of hydrophobic monomers may be used. The phrase "single type" refers to same chemical compounds whereas the phrase "different types" refers to different chemical compounds. For example, styrene is a single type of hydrophobic monomer while styrene and alkyl (meth)acrylates are different types of hydrophobic monomers. Methyl (meth)acrylate is a single type of hydrophobic monomer (specifically, a single type of alkyl (meth)acrylate) while methyl (meth)acrylate and ethyl (meth)acrylate are different types of hydrophobic monomers (specifically, different types of alkyl (meth)acrylates). Thus, the phrase "one or more types" encompasses both monomers of a single type and monomers of different types.

In embodiments, the hydrophobic monomers comprise (or consist of) styrene, an alkyl (meth)acrylate (e.g., methyl (meth)acrylate, ethyl (meth)acrylate, butyl (meth)acrylate, or combinations thereof), or both. Thus, the alkyl group of the alkyl (meth)acrylates may have 1 or more carbons, 2 or more carbons, 4 or more carbons, or from 1 to 6 carbons.

In embodiments, certain hydrophobic monomers are not used to form the resin particles, including 4-methylstyrene, cyclohexyl acrylate, isobornyl methacrylate, isobornyl acrylate, a (meth)acrylamide, or combinations thereof.

Generally, the hydrophobic monomers which are used are monofunctional, by which it is meant comprising a single polymerizable group.

Anionic monomers are used to form the resin particles. Anionic monomers are monomers comprising a polymerizable moiety (e.g., a carbon-carbon double bond) and an anionic moiety. The anionic moiety is a chemical group that is capable of assuming a negative charge, including in the present aqueous inkjet ink compositions. In embodiments, the negative charge is a formal charge of less than zero, e.g., −1. Without wishing to be bound to any particular theory, it is believed that when incorporated into the polymeric material from which the resin particles are composed, the anionic monomers provide the resin particles in the aqueous inkjet ink compositions with a negative charge. These resin particles prevent pigment particle aggregation in the aqueous inkjet ink compositions (thereby improving the stability of the aqueous inkjet ink compositions) via both electrostatic repulsion (via their negative charge) and steric repulsion (via their physical size). The anionic moiety of the anionic monomer may be an acidic moiety, a chemical group that is capable of deprotonating, including in the present aqueous inkjet ink compositions, thereby rendering it negatively charged with a formal charge of less than zero, e.g., −1. Salts of the anionic monomers are also encompassed, e.g., in which a donated hydrogen of the anionic moiety is replaced by a cation. Thus, "anionic monomer" also refers to a salt thereof.

The anionic monomers which are used in the resin particles include crosslinkable anionic monomers comprising at least two polymerizable moieties and the anionic moiety (e.g., the acidic moiety) described above. As demonstrated in the Examples below (Example 2), it has been found that the use of crosslinkable anionic monomers, including in the amounts described below, afford embodiments of the present aqueous inkjet ink compositions with improved stability when certain humectants, e.g., 1,2-hexanediol, are also included.

In embodiments, crosslinkable phosphoric acid monomers are used. Such monomers comprise at least two polymerizable moieties (e.g., carbon-carbon double bonds) and a $P(O)(OR)_3$ moiety (the anionic/acidic moiety). The polymerizable moieties may be provided by the R group(s) of the $P(O)(OR)_3$ moiety. In embodiments, the crosslinkable phosphoric acid monomer has Formula I, $P(O)(OR)_3$, wherein one R group is hydrogen and two R groups are independently selected polymerizable organic groups (i.e., an organic group comprising the polymerizable moiety). These two R groups may be the same or different. Salts of the crosslinkable phosphoric acid monomer are also encompassed, i.e., in which the hydrogen of an OH group is replaced by a cation. Thus, "crosslinkable phosphoric acid monomer" also refers to a salt thereof. The $P(O)(OR)_3$ moiety is distinguished from a phosphonic acid moieties having formula $P(O)(OR)_2R$.

In embodiments of Formula I, the organic group comprising the polymerizable moiety is an alkyl (meth)acrylate. In embodiments, the alkyl group of the alkyl (meth)acrylate has at least 2 carbons, at least 3 carbons, at least 4 carbons, at least 5 carbons, or from 1 to 6 carbons. In embodiments, at least one R is ethyl (meth)acrylate. In embodiments, the crosslinkable phosphoric acid monomer has two ethyl (meth)acrylate groups. Illustrative crosslinkable phosphoric acid monomers include phosphoric acid 2-hydroxyethyl methacrylate ester and bis[2-(methacryloyloxy)ethyl] phosphate. Both types of crosslinkable phosphoric acid monomers may be used together.

In embodiments of Formula I, the organic group has Formula A

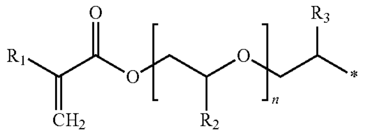

wherein $R_{1-3}$ are independently selected from hydrogen and methyl; n is from 0 to 20, including any number between 0 and 20; and "*" denotes the bond to an oxygen of the $P(O)(OR)_3$ moiety. In embodiments, n is 0, $R_1$ is hydrogen or methyl, and $R_3$ is hydrogen. As noted above, two such organic groups are present in the crosslinkable phosphoric acid monomer.

In embodiments of Formula I, the crosslinkable phosphoric acid monomer is based on poly(ethylene glycol) wherein in Formula A. $R_1$ is hydrogen or methyl, $R_2$ is hydrogen, $R_3$ is hydrogen and n is from 0 to 20. In embodiments, n is from 1 to 20. This includes from 2 to 16 and from 4 to 12. As noted above, two such organic groups are present in the crosslinkable phosphoric acid monomer.

In embodiments, of Formula I, the crosslinkable phosphoric acid monomer is based on poly(propylene glycol) wherein in Formula A, $R_1$ is hydrogen or methyl, $R_2$ is methyl, $R_3$ is methyl and n is from 0 to 20. In embodiments, n is from 1 to 20. This includes from 2 to 16 and from 4 to 12. As noted above, two such organic groups are present in the crosslinkable phosphoric acid monomer.

A single type or combinations of different types of crosslinkable phosphoric acid monomers may be used. (The meaning of "single type," "different types," and "one or more types" is analogous to that described above for hydrophobic monomers.)

In embodiments, the crosslinkable anionic monomers comprise (or consist of) crosslinkable phosphoric acid monomers, e.g., those having Formula I, e.g., phosphoric acid 2-hydroxyethyl methacrylate ester and bis[2-(methacryloyloxy)ethyl] phosphate.

Use of the crosslinkable anionic monomers, including the crosslinkable phosphoric acid monomers, results in the resin particles being crosslinked. Thus, the present resin particles may be referred to as being "crosslinked resin particles."

Other anionic monomers which may be used include monofunctional anionic monomers. Monofunctional anionic monomers comprise a single (i.e., only one) polymerizable group and the anionic (e.g., acidic) moiety described above. Illustrative monofunctional anionic monomers include acrylic acid, methacrylic acid, ethylacrylic acid, dimethylacrylic acid, 2-carboxyethyl acrylate, maleic anhydride, maleic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, vinyl benzoic acid, styrene sulfonic acid, vinylsulfonate, 2-methacryloyloxymethane-1-sulfonic acid, 3-methacryoyloxypropane-1-sulfonic acid, 3-(vinyloxy)propane-1-sulfonic acid, ethylene sulfonic acid, 2-acrylamido-2-methyl-1-propanesulfonic acid, sulfoethyl methacrylate, sulfopropyl acrylate, sulfoethyl acrylate vinyl sulfuric acid, 4-vinylphenyl sulfuric acid, and combinations thereof. Monofunctional phosphoric acid monomers may also be used. As with the crosslinkable anionic monomers, the monofunctional anionic monomers also encompass salts thereof. Similarly, a single type or combinations of different types of monofunctional anionic monomers may be used. (The meaning of "single type," "different types," and "one or more types" is analogous to that described above for hydrophobic monomers.)

In embodiments, monofunctional anionic monomers are used along with the crosslinkable anionic monomers. In embodiments, the monofunctional anionic monomers comprise (or consist of) (meth)acrylic acid.

A variety of other monomers may be used to form the resin particles. For example, a monomer which is an ester of (meth)acrylic acid with an alcohol comprising a dioxane moiety or an alcohol comprising a dioxolane moiety may be used. In the present disclosure, this type of monomer may be referred to as an "dioxane/dioxolane monomer." This phrase, dioxane/dioxolane monomer, encompasses the monomer which is the ester of (meth)acrylic acid with the alcohol comprising the dioxane moiety, the monomer which is the ester of (meth)acrylic acid with the alcohol comprising the dioxolane moiety, and both such monomers. The dioxane moiety may be a 1,3-dioxane moiety and the dioxolane moiety may be a 1,3-dioxolane moiety. The alcohol comprising the dioxane/dioxolane moiety may be an acetal of a triol, a ketal of a triol, or a carbonate of a triol. Illustrative triols include glycerol and trimethylolpropane. The triol may be unsubstituted or substituted. By "substituted" it is meant that one or more bonds to a carbon(s) or hydrogen(s) are replaced by a bond to non-hydrogen and non-carbon atoms. The dioxane/dioxolane monomer may have Formula II (dioxane) or III (dioxolane) as shown below, wherein R is selected from hydrogen and methyl; R' is selected from hydrogen and ethyl; and Z is selected from hydrogen, an oxygen of a carbonyl group, an alkyl group, an aryl group, and an alkoxy group. Either or both types of monomers may be used in the resin particles.

Formula II

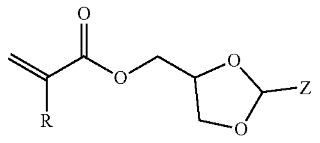

Formula III

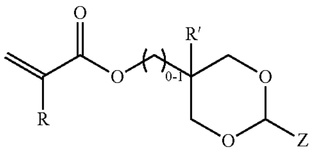

The carbonyl group refers to a C═O group, that is Z is O covalently bound to the carbon via a double bond, thereby forming a carbonyl group between the two oxygens of the 5 or 6-membered ring. The alkyl group may be linear or branched. The alkyl group may have from 1 to 20 carbons. This includes having from 1 to 18 carbons and from 1 to 10 carbons, e.g., 1, 2, 3, 4, 5, 6, 7, 8, 9, or 10 carbons. The alkyl group may be substituted or unsubstituted. The aryl group may be monocyclic having one aromatic ring, e.g., benzene, or polycyclic having one or more fused rings. The aryl group may be unsubstituted or substituted as described above with respect to the alkyl group, although substituted aryl groups also encompass aryl groups in which a bond to a hydrogen(s) is replaced by a bond to an unsubstituted or substituted alkyl group as described above. The alkoxy group refers to an —O-alkyl group.

Illustrative dioxane/dioxolane monomers include glycerol formal (meth)acrylate, trimethylolpropane formal (meth) acrylate, and isopropylideneglycerol (meth)acrylate. A single type or combinations of different types of dioxane/dioxolane monomers may be used. In embodiments, however, the dioxane/dioxolane monomer is glycerol formal (meth)acrylate. Glycerol formal (meth)acrylate has a relatively high $T_g$ (about 85-90° C.). In the present disclosure, the name "glycerol formal (meth)acrylate" (as well as the names of the other dioxane/dioxolane monomers described in this paragraph) refers to either the dioxane isomer, the dioxolane isomer, or both. That is, all possibilities are encompassed by the names.

Generally, the dioxane/dioxolane monomers which are used are monofunctional, by which it is meant comprising a single polymerizable group.

Although not necessary, multifunctional monomers, i.e., those comprising more than one polymerizable group (e.g., 2, 3, 4), may be used to form the resin particles. (The term "multifunctional monomer" is a term distinguished from the disclosed crosslinkable anionic monomers by not comprising the anionic (e.g., acidic) moieties described above.) Illustrative multifunctional monomers include difunctional monomers such as a poly(ethylene glycol) di(meth)acrylate, e.g., poly(ethylene glycol) diacrylate having a molecular weight of 250 g/mol. Other poly(ethylene glycol) di(meth) acrylates may be used, including those having a molecular weight in a range of from 214 g/mol to 1000 g/mol, from 214 g/mol to 500 g/mol, and from 214 g/mol to 300 g/mol. These molecular weight values may be determined using gel permeation chromatography. Other difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene(2)-2,2-bis(4-hydroxyphenyl) propane diacrylate, polyoxyethylene(4)-2,2-bis(4-hydroxyphenyl)propane diacrylate, and compounds obtained by substituting acrylate of these compounds with methacrylate. Other difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

In embodiments, however, the monomers which are used to form the resin particles do not include multifunctional monomers. In embodiments, the monomers which are used to form the resin particles do not include a di(meth)acrylamide (e.g., diacetone diacrylamide). Similarly, in embodiments, crosslinking agents, e.g., epoxide containing compounds, are not used to form the resin particles.

Reactive surfactants may be used to form the resin particles. Suitable reactive surfactants comprise a polymerizable (and thus, reactive) group such that they become incorporated into the resin particles. Thus, reactive surfactants are distinguished from the other "surfactants" described herein. The reactive surfactants may be monofunctional comprising a single polymerizable group. Illustrative reactive surfactants include anionic ether sulfate reactive surfactants such as those in the commercially available Hitenol series. Suitable reactive surfactants include polyoxyethylene alkylphenyl ether ammonium sulfates including Hitenol BC-10, BC-20, BC10-25, BC-2020, BC-30; polyoxyethylene styrenated phenyl ether ammonium sulfates including Hitenol AR-10, AR-1025, AR-20, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the resin particles. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In embodiments, other certain monomers are excluded in forming the resin particles. Monomers which may be excluded are unsaturated ethylene monomers having an alkyl group having from 12 to 22 carbons.

In forming the resin particles, various combinations of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles, including to achieve the values of the properties described below. Illustrative amounts are provided below.

The total amount of hydrophobic monomers used in the monomer emulsion may be in a range from 70 weight % to 97 weight %, from 75 weight % to 95 weight %, or from 75 weight % to 80 weight %. (Here, weight % refers to the (total weight of hydrophobic monomers)/(total weight of monomers in the monomer emulsion, excluding the reactive surfactants)*100). When present, the alkyl (meth)acrylate (e.g., methyl (meth)acrylate, ethyl (meth)acrylate), butyl (meth)acrylate) may be present at an amount of at least 20 weight %, at least 25 weight %, at least 30 weight % or in a range of from 20 weight % to 40 weight %. (Weight % has a meaning analogous to that described for hydrophobic monomers.)

The total amount of anionic monomers (which includes both crosslinkable anionic monomers and monofunctional anionic monomers) used in the monomer emulsion may be at least 15 weight %, at least 16 weight %, at least 18 weight %, at least 20 weight %, or at least 22 weight %. This encompasses amounts from 15 weight % to 25 weight %, from 16 weight % to 25 weight %, from 18 weight % to 25 weight %, and from 20 weight % to 25 weight %. (Weight % has a meaning analogous to that described for hydrophobic monomers.) As demonstrated in the Examples below (Example 3), it has been found that certain of these amounts afford embodiments of the present aqueous inkjet ink compositions with improved stability. The total amount of crosslinkable anionic monomers used in the monomer emulsion may be at least 1 weight %, at least 2 weight %, at least 3 weight %, at least 4 weight %, at least 5 weight %, at least 8 weight %, or at least 10 weight %. This encompasses amounts of from 1 weight % to 12 weight %, from 1 weight % to 10 weight %, from 2 weight % to 10 weight %, from 3 weight % to 10 weight %, and from 2 weight % to 6 weight %. (Weight % has a meaning analogous to that described for hydrophobic monomers.) As demonstrated in the Examples below (Example 2), it has been found that certain of these amounts afford embodiments of the present aqueous inkjet ink compositions with improved stability when certain humectants, e.g., 1,2-hexanediol, are also included. As noted above, in embodiments, both crosslinkable anionic monomers and monofunctional anionic monomers are used. In such embodiments, a weight ratio of the total amount of the crosslinkable anionic monomers to the total amount of the monofunctional anionic monomers is 1.0 or less, less than 0.9, less than 0.8, less than 0.7, less than 0.6, less than 0.5, less than 0.4, or in a ratio of from 0.1 to 1.0, 0.1 to 0.8, 0.1 to 0.5, or 0.1 to 0.4.

If a dioxane/dioxolane monomer is used in the monomer emulsion, the total amount of dioxane/dioxolane monomers may be in a range of from 1 weight % to 40 weight %, 1 weight % to 30 weight %, 1 weight % to 20 weight %, from 1 weight % to 10 weight %, and from 1 weight % to 5 weight %. (Weight % has a meaning analogous to that described for hydrophobic monomers.)

If a multifunctional monomer is used in the monomer emulsion, the total amount of multifunctional monomers may be in a range of from 0.001 weight % to 1.5 weight %, from 0.001 weight % to 0.8 weight %, and from 0.01 weight % to 0.6 weight %. (Weight % has a meaning analogous to that described for hydrophobic monomers.) However, in embodiments, no multifunctional monomer is used.

If a reactive surfactant is used in the monomer emulsion, the total amount of reactive surfactant may be in a range of from 0.1 weight % to 6.5 weight %. (Here, weight % refers to the (total weight of reactive surfactants)/(total weight of monomers in the monomer emulsion, including the reactive surfactant monomers)*100). This range includes from 0.3 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent, hydrophobic monomers, and anionic monomers comprising crosslinkable anionic monomers, e.g., crosslinkable phosphoric acid monomers. In embodiments, the monomer emulsion comprises (or consists of) a solvent, hydrophobic monomers, crosslinkable anionic monomers, and monofunctional anionic monomers. In any of the embodiments in this paragraph, the hydrophobic monomers may comprise (or consist of) styrene and an alkyl (meth)acrylate, e.g., butyl acrylate. In any of the embodiments in this paragraph, the crosslinkable phosphoric acid monomers may comprise (or consist of) those having Formula I $P(O)(OR)_3$, wherein one R group is hydrogen and two R groups are independently selected polymerizable organic groups. In embodiments, the polymerizable organic group is an alkyl (meth)acrylate, e.g., ethyl (meth)acrylate.

In embodiments, the crosslinkable phosphoric acid monomers comprise (or consist of) phosphoric acid 2-hydroxyethyl methacrylate ester, bis[2-(methacryloyloxy)ethyl] phosphate, or a combination thereof. In any of the embodiments in this paragraph, the monofunctional anionic monomers may comprise (or consist of) methacrylic acid. In any of the embodiments in this paragraph, a reactive surfactant may be used. In any of the embodiments in this paragraph, a chain transfer agent may be used. In any of the embodiments in this paragraph, amounts of the various monomers, reactive surfactants, and chain transfer agents may be used as described above. The balance may be made up of the solvent.

In embodiments, the monomer emulsion is free of (i.e., does not comprise) a surfactant. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and block copolymer of polyethylene oxide and polypropylene oxide. Thus, the monomer emulsion may be free of (i.e., does not comprise) any of these surfactants.

Various polymerization techniques may be used to form the resin particles such as monomer-starved emulsion polymerization, conventional emulsion polymerization, suspension polymerization, mini-emulsion polymerization, nano-emulsion polymerization, seeded-emulsion polymerization, and microemulsion polymerization. These polymerization techniques may make use of any of the monomer emulsions described above. An illustrative seeded-emulsion polymerization process is described below. It is noted, however, that the polymerization technique used provides the polymerized polymer in the form of resin particles which are insoluble in aqueous media. This is by contrast to polymerization techniques, e.g., solution polymerization, including those described in U.S. Pat. Nos. 9,359,522, 9,963,592, and U.S. Pub. No. 20210222025, each of which provide solubilized polymers in organic media.

In an illustrative seeded-emulsion polymerization method for forming the resin particles, the method comprises adding a first portion of any of the monomer emulsions described above to a reactive surfactant solution at a feed rate over a period of time. The first portion of the monomer emulsion that is added to the reactive surfactant solution refers to a portion of a total amount of the monomer emulsion being used in the method to form the resin particles. This first portion may be an amount that is in a range of from 1% to 20% by weight of a total amount of the monomer emulsion. This includes from 2% to 15% by weight and from 2% to 10% by weight. As described below, a remaining portion of the monomer emulsion is used in later steps of the method. The feed rate that the first portion of the monomer emulsion is added may be in a range of from 1 mL/min to 10 mL/min based on a total reaction volume of 1 L. The period of time over which the first portion of the monomer emulsion is added may be in in a range of from 5 minutes to 100 minutes.

The reactive surfactant solution comprises a solvent and a reactive surfactant. Any of the solvents and any of the reactive surfactants described above may be used. One type or different types of solvent and/or reactive surfactants may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 1 weight % to 10 weight %. (Here, weight % refers to the (total weight of reactive surfactants)/(total weight of reactive surfactant solution)*100.) This range includes from 2 weight % to 5 weight %. The buffer may be used in an amount in a range of from 0.25 weight % to 4 weight %. (Weight % has a meaning analogous to that described above.)

In embodiments, the reactive surfactant solution comprises (or consists of) a solvent (e.g., water), a reactive surfactant, and optionally, a buffer. In such embodiments, one type or different types of these components may be used. In any of these embodiments, amounts of the reactive surfactants and buffer may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any monomers, other than the reactive surfactant monomer(s) present in the solution. In at least some embodiments, the reactive surfactant solution is free of (i.e., does not comprise) an initiator.

The addition of the first portion of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the first portion of the monomer emulsion and continuing during the addition of the first portion of the monomer emulsion.

Next, a first portion of an initiator solution is added to the combined first portion of the monomer emulsion/reactive surfactant solution (i.e., the "reaction mixture") at a feed rate over a period of time. The first portion of the initiator solution that is added to the reaction mixture refers to a portion of a total amount of the initiator solution being used in the method to form the resin particles. This first portion may be an amount that is in a range of from 10% to 90% by weight of a total amount of the initiator solution. This includes from 12% to 85% by weight and from 15% to 75% by weight. As described below, a remaining portion of the initiator solution is used in later steps of the method. This feed rate may be in a range of from 1 mL/min to 10 mL/min based on a total reaction volume of 1 L. The period of time over which the initiator solution is added may be in in a range of from 0.1 min to 10 min. from 0.5 min to 5 min, and from 0.5 min to 3 min. The addition of the initiator solution may be carried out at the elevated temperature and under inert gas as described above. In the presence of the initiator, the monomers of the monomer emulsion undergo polymerization reactions to form resin seeds in the reaction mixture.

The initiator solution comprises an initiator and any of the solvents described above. One type or different types of solvent and/or initiators may be used. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionanidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2'-azobis[2-methyl-N-(phenylmethyl) propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, and combinations thereof. The initiator may be used in an amount in a range of from 0.1 weight % to 10 weight %. (Here, weight % refers to the (total weight of initiators)/(total weight of initiator solution)*100.)

Next, a second portion of the monomer emulsion is added to the reaction mixture, now comprising the resin seeds, at a feed rate over a period of time. The amount of this second portion may be the remainder of the total amount of the monomer emulsion being used in the method to form the resin particles. This feed rate and period of time may be within the ranges described above for the first portion, but they need not be the same as those used for the first portion. The addition of the second portion may be carried out at the elevated temperature and under inert gas as described above.

A second portion of the initiator solution is also added to the reaction mixture. The amount of this second portion may be the remainder of the total amount of the initiator solution being used in the method to form the resin particles. The second portion of the initiator solution may be added either intermittently (i.e., in discrete portions) or continuously (i.e., at a feed rate) during the addition of the second portion of the monomer emulsion described above. Apportionment of the initiator solution can significantly reduce the total amount of initiator required or total reaction time required to achieve resin particles having a desired size. Alternatively, the second portion of the initiator solution may be added at a feed rate and period of time, but after the addition of the second portion of the monomer solution is completed. In this case, the feed rate and period of time may be within the ranges described above for the addition of the first portion of the initiator solution, but they need not be the same. The addition of the second portion of initiator solution may be carried out at the elevated temperature and under inert gas as described above.

The addition of the second portion of the monomer emulsion and the addition of the additional amount of initiator solution enables further polymerization reactions between monomers to grow the resin seeds into the resin particles.

"Hold" periods may be included between any of the steps described above, i.e., periods of time in which the reaction mixture is simply held at the desired temperature (e.g., the elevated temperature) without adding any components. These periods of time may be in a range of from 1 minute to 2 hours, including from 1 minute to 1 hour, and from 1 minute to 20 minutes. The method may comprise a final hold, e.g., from in a range of from 1 hour to 5 hours or from 1 hour to 3 hours. The temperature used at for the final hold may be higher than that used during other steps of the method, including higher than the elevated temperature. This temperature in the final hold may be in a range of from 70° C. to 100° C. or from 75° C. to 95° C.

The result of the steps described above is a latex comprising water and resin particles. These latexes are also encompassed by the present disclosure. They are distinguished from the disclosed aqueous inkjet ink compositions by not including the disclosed pigment particles. In addition, the latexes generally do not include the co-medium. e.g., humectants, described below.

It is noted that, at least in embodiments, the methods described above do not involve the use of any of the surfactants (other than the reactive surfactant monomers) described above.

The composition of the resin particles depends upon the selection of the monomers and their relative amounts, as well as the polymerization reactions between selected monomers that produce a polymerization product as described above. Thus, a variety of compositions are encompassed, including those based on various polymerization products of reactants comprising various combinations of monomers. As noted above, the reactants include hydrophobic monomers and anionic monomers comprising crosslinkable anionic monomers but other types of monomers may also be included. For clarity, the composition of the resin particles may be identified by reference to the monomers which are polymerized, recognizing that the chemical form of those monomers is generally altered as a result of the polymerization reactions. Once polymerized in the resin particles, monomers may be referred to as "polymerized monomers."

In embodiments, the resin particles comprise (or consist of) the polymerization product (e.g., copolymer) of reactants comprising hydrophobic monomers and anionic monomers comprising crosslinkable anionic monomers, e.g., crosslinkable phosphoric acid monomers. In embodiments, the resin particles comprise (or consist of) the polymerization product (e.g., copolymer) of reactants comprising hydrophobic monomers, crosslinkable anionic monomers, and monofunctional anionic monomers. In any of the embodiments in this paragraph, the hydrophobic monomers may comprise (or consist of) styrene and an alkyl (meth)acrylate, e.g., butyl acrylate. In any of the embodiments in this paragraph, the crosslinkable phosphoric acid monomers may comprise (or consist of) those having Formula I $P(O)(OR)_3$, wherein one R group is hydrogen and two R groups are independently selected polymerizable organic groups. In embodiments, the polymerizable organic group is an alkyl (meth)acrylate, e.g., ethyl (meth)acrylate. In embodiments, the crosslinkable phosphoric acid monomers comprise (or consist of) phosphoric acid 2-hydroxyethyl methacrylate ester, bis[2-(methacryloyloxy)ethyl] phosphate, or a combination thereof. In any of the embodiments in this paragraph, the monofunctional anionic monomers may comprise (or consist of) methacrylic acid. In any of the embodiments in this paragraph, a reactive surfactant (e.g., an anionic ether sulfate) may be used. In any of the embodiments in this paragraph, an initiator (or a portion thereof) may be incorporated at an end of each polymer chain in the resin particles.

In any of the embodiments in the paragraph immediately above, the polymerized monomers may be present in the resin particles in the amounts described above with respect to the amounts of monomers in the monomer emulsion. This is because experiments have shown that the conversion of the monomers during the polymerization reactions is above 99.9%. For example, the total amount of anionic monomers in the resin particles may be in a range of from 15 weight % to 25 weight % or from 20 weight % to 25 weight %. Analogous to the definition of weight % provided above, when referring to the resin particles, the term weight % refers to (total weight of polymerized anionic monomers)/(total weight of polymerized monomers, excluding polymerized reactive surfactants)*100).

Using a specific, illustrative composition, the composition of the resin particles may be identified as poly[(styrene)-ran-(butyl acrylate)-ran-(bis[2-(methacryloyloxy)ethyl] phosphate)-ran-(methacrylic acid)-ran-(anionic ether sulfate)]. The different chemical moieties which result from the polymerization reactions is identified by reference to the corresponding monomer in its parenthesis and "ran" refers to the random incorporation of the different monomers into the copolymer. The use of this description encompasses the presence of an initiator (or portion thereof) at the beginning of each copolymer as well as the crosslinked nature of the resin particles.

In embodiments in which certain monomers (or other reactants) are excluded from forming the resin particles, it follows that such monomers (or other reactants) do not participate in the polymerization reactions to form the polymeric matrix of the resin particles. Thus, in these embodiments, the resin particles may be described as being free of (i.e., not comprising) one or more of 4-methylstyrene, cyclohexyl acrylate, isobornyl methacrylate, isobornyl acrylate, a di(meth)acrylamide (e.g., diacetone acrylamide), and an unsaturated ethylene monomer having an alkyl group having from 12 to 22 carbons.

Resin particles may be present in the aqueous inkjet ink composition in an amount in a range of from 1 weight % to 10 weight %, from 1 weight % to 8 weight %, and from 1 weight % to 6 weight %. (Here, weight % refers to the (total weight of resin particles)/(total weight of aqueous inkjet ink composition)*100.)

The resin particles of the aqueous inkjet ink composition may be characterized by their size. The size of the particles may be reported as an MV particle size. A Nano-flex (Microtrac, Inc.) may be used to determine the MV particle size, which refers to a mean volume diameter, which is the mean diameter (in nanometers) of the volume distribution of particles in a sample as set forth in the operating manual of the Nano-flex instrument. In embodiments, the resin particles are characterized by a MV particle size of from 60 nm to 200 nm. This includes from 60 nm to 150 nm, and from 70 nm to 120 nm. Thus, resin particles are distinguished from individual polymer molecules.

The resin particles of the aqueous inkjet ink compositions may also be characterized by their $T_g$ values. The $T_g$ values may be measured using a Differential Scanning Calorimetry (DSC) TA Instruments Discovery DSC 2500. In embodiments, the $T_g$ is in a range of from 25° C. to 70° C. This includes from 35° C. to 65° C., and from 40° C. to 60° C.

The resin particles of the aqueous inkjet ink composition may also be characterized by their charge. The resin particles are negatively charged in the aqueous inkjet ink composition, which may have a pH of from greater than 7 to 10, from greater than 7 to 9, or from 7.5 to 9. As described above, this negative charge is due to the use of the anionic monomers.

Various counterions (cations) may be present in the latexes and aqueous inkjet ink compositions comprising the disclosed resin particles. The type of counterions is not particularly limited, but may include, e.g., $Na^+$, $K^+$, $Ca^{2+}$, etc.

Liquid System

The aqueous inkjet ink compositions comprise a liquid system based on water. The liquid system may comprise a mixture of water and one or more of a water-soluble organic liquid and a water-miscible organic liquid. The water-soluble organic liquids and the water-miscible organic liquids may be referred to herein as co-media. As further noted below, at least some water-soluble organic liquids and water-miscible organic liquids may be referred to herein as humectants. Suitable such co-media include alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol. Illustrative examples include ethylene glycol, propylene glycol, diethylene glycols, hexyl glycol, glycerine, dipropylene glycols, thiodiglycol, trimethylolpropane, 1,2-hexanediol, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,3-butanediol, 1,4-butanediol, and 2,4-heptanediol. Other suitable co-media include amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, lactams, polvelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, and substituted and unsubstituted acetamides. Combinations of these co-media may be used.

Suitable co-media include a glycol of hydrocarbons having a carbon number of 4 to 7. Examples of such a glycol include 1,2-pentanediol; 1,2-hexanediol; 1,5-pentanediol; 1,6-hexanediol; 3-methyl-1,3-butanediol; 1,2-butanediol; 2,4-pentanediol; 1,7-heptanediol; 3-methyl-1,5-pentanediol; trimethylolpropane; 1,2,6-hexantriol; 1,2,3-butanetriol; sorbitol; diethylene glycol; 1,2,4-butanetriol; glycerol; diglycerol; and triethylene glycol.

In embodiments, the liquid system comprises (or consists of) water and a humectant selected from one or more of: 1,2-hexanediol, propylene glycol, butanediol, polyethylene glycol, trimethylolpropane, trimethanolethane, ethylene glycol, diethylene glycol, triethylene glycol, tetraethylene glycol, dipropylene glycol, hexylene glycol, glycerin, and combinations thereof.

In embodiments, the liquid system comprises (or consists of) water, and a humectant selected from a 1,2-alcohol (e.g., 1,2-hexanediol), a glycol (e.g., propylene glycol, hexylene glycol), and glycerol. As demonstrated in the Examples below (Example 2), some humectants, e.g., 1,2-hexanediol, tend to strongly interfere with particle stability, leading to agglomeration. However, it has been found that the use of crosslinkable anionic monomers in the present resin particles, including in the amounts described above, afford embodiments of the present aqueous inkjet ink compositions with improved stability in the presence 1,2-hexanediol.

In liquid systems comprising water and a co-medium, the water to co-medium weight ratio, as well as the type and relative amount of different co-media, may be selected to achieve certain properties for the aqueous inkjet ink composition such as a desired surface tension, viscosity, decap time, latency, dry time, penetration, etc.

Various total amounts of the liquid system may be used in the aqueous inkjet ink compositions. In embodiments, the liquid system is present in an amount of from 50 weight % to 95 weight %, from 60 weight % to 90 weight %, or from 65 weight % to 90 weight %. (Here, weight % refers to the (total weight of liquid system)/(total weight of aqueous inkjet ink composition)*100.) In embodiments, the total amount of water present is at least 50 weight %, at least 60 weight %, at least 70 weight %, at least 80 weight %, or in a range of from 50 weight % to 95 weight %. (Here, weight % refers to the (total weight of water)/(total weight of aqueous inkjet ink composition)*100.) In embodiments, the total amount of co-medium(media) being used is in a range of from 15 weight % to 40 weight %, from 20 weight % to 40 weight %, and from 20 weight % to 35 weight %. These weight % refer to the weight of co-medium(media) (e.g., a 1,2-alcohol (e.g., 1,2-hexanediol), a glycol (e.g., propylene glycol, hexylene glycol), and glycerol) as compared to the total weight of the aqueous inkjet ink composition.

Pigment Particles

The aqueous inkjet ink compositions comprise pigment particles. Examples of suitable pigments include white pigments, black pigments, cyan pigments, magenta pigments, and yellow pigments. Pigments can be organic or inorganic particles. Suitable inorganic pigments include carbon black. However, other inorganic pigments may be suitable such as cobalt blue ($CoO—Al_2O_3$), chrome yellow ($PbCrO_4$), iron oxide, titanium dioxide ($TiO_2$), $BaSO_4$. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., acidic dye type chelate), nitro pigments, nitroso pigments, and anthanthrone pigments such as Pigment Red 168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209. Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151. Pigment Yellow 155, Pigment Yellow 180, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. In embodiments, the pigment particles do not comprise any of the quinacridone-based pigments disclosed in U.S. Pat. No. 9,359,522.

In embodiments, the pigment particles used in the aqueous inkjet ink compositions are dispersed pigment particles comprising pigment particles and a dispersant. In embodiments, the dispersant is a polymer dispersant to provide polymer dispersed pigment particles. In embodiments, the dispersant is a surfactant dispersant to provide surfactant dispersed pigment particles. The pigment particles of dispersed pigment particles (including both polymer dispersed pigment particles and surfactant dispersed pigment particles) are unmodified, by which it is meant that the pigment particles are insoluble, by themselves, in water and in the aqueous inkjet ink compositions. It is further meant that the pigment particles (e.g., their surfaces) do not comprise bound (e.g., chemically bound) molecules or molecular groups that would otherwise enable the pigment particles to be solubilized in water and in the aqueous inkjet ink compositions. As such, dispersed pigment particles (including both polymer dispersed pigment particles and surfactant dispersed pigment particles) are distinguished from self-dispersed pigment particles. Although in embodiments self-dispersed pigment particles may be used in the present aqueous inkjet ink compositions, in other embodiments, no self-dispersed pigment particles are used. Self-dispersed pigment particles which may be used or excluded from the present aqueous inkjet ink compositions include CAB-O-JET® 200, CAB-O-JET® 300, CAB-O-JET® 450, CAB-O-JET 352K, CAB-O-JET 250C, CAB-O-JET 260M, CAB-O-JET 270Y, CAB-O-JET 465M, CAB-O-JET 470Y and CAB-O-JET 480V available from Cabot Corporation.

Dispersed pigment particles may be formed by combining desired amounts of the pigment particles and the surfactant dispersant or polymer dispersant by grinding, e.g., in a micro mill. Illustrative surfactant dispersants include sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. Surfactant dispersants include nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and block copolymer of polyethylene oxide and polypropylene oxide. The reactive surfactants described above may also be used as the surfactant dispersant. In embodiments, the surfactant dispersant is an anionic surfactant dispersant. In embodiments, a cationic surfactant dispersant is not used.

Polymer dispersants include acrylic polymers such as styrene-acrylic copolymers and vinylpyrrolidone copolymers, urethane or polyurethane dispersions, and acrylic-urethane hybrid dispersions. In embodiments, the polymer dispersant is an anionic polymer dispersant. More specific polymer dispersants include those available from Johnson Polymers (BASF) such as Joncryl® 671, Joncryl® 683, Joncryl® 296, Joncryl® 690, Joncryl HPD 296, Joncryl HPD96-E, Joncryl LMV 7085, Joncryl 8082. Other specific polymer dispersants include Zetasphere 2500 available from Evonik (non-ionic) and PDP series such as PDP10, PDP66, PDP83, PDP64, PDP07, available from Kodak. If a polymer dispersant is used, it is distinguished from the present resin particles, which have a different composition and are particulate in form. Commercially available polymer dispersed pigment particles which may be used include Specialty Black Dispersion Type P2, Specialty Cyan Dispersion Type P2, Specialty Yellow Dispersion Type P2, Specialty Magenta Dispersion Type P3, Specialty Black Dispersion Type P4, Specialty Cyan Dispersion Type P1, Specialty Magenta Dispersion Type P1, and Specialty Yellow Dispersion Type P1, available from Kodak, Inc.

The pigment particles are particulate in form and may have a particle size of from 20 nm to 500 nm, from 20 nm to 400 nm, or from 30 nm to 300 nm. The particle size may be reported as a MV particle size as described above with respect to the resin particles. If no dispersant is used, these particle sizes refer to the pigment particles themselves. If a dispersant is used, these sizes refer to the pigment particles and possibly, an amount of the dispersant adsorbed to the surfaces of the pigment particles.

Various amounts of the pigment particles may be used in the aqueous inkjet ink compositions. In embodiments, the pigment particles are present in an amount of from 3 weight % to 10 weight %, from 3 weight % to 8 weight %, or from 3 weight % to 6 weight %. (Here, weight % refers to the (total weight of pigment particles)/(total weight of aqueous inkjet ink composition)*100.) If different types of pigment particles are being used, these amounts refer to the total amount of the pigment particles. If polymer dispersed pigment particles or surfactant dispersed pigment particles are being used, these amounts refer to the total amount of the pigment particles and do not include the polymer/surfactant dispersant being used.

In embodiments, the pigment particles being used comprise (or consist of) magenta pigment particles, black pigment particles, or both. In general, it is particularly challenging to achieve stable aqueous inkjet ink compositions using these pigment particles (e.g., as opposed to cyan pigment particles and yellow pigment particles) as a larger amount of these pigment particles is required to achieve suitable color intensities. Magenta pigment particles present further challenges as the size of magenta pigment particles is larger as compared to other pigment particles. In embodiments, the pigment particles being used comprise (or consist of) dispersed magenta pigment particles, dispersed black pigment particles, or both. In embodiments, the pigment particles being used comprise (or consist of) polymer dispersed magenta pigment particles, polymer dispersed black pigment particles, or both.

Surfactant

Unlike the monomer emulsions and latexes described above, the aqueous inkjet ink compositions may comprise one or more surfactants. However, if used, these surfactants are distinguished from those used as a pigment dispersant as described above. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-S-7, Tergitol™ 15-S-9, TMN-6, TMN-100x and Tergitol™ NP-9, Triton™ X-100, etc.). Some fluorinated or silicone surfactants can be used such as PolyFox™ TMPF-136A, 156A, 151N, Chemguard S-761p, S-764p, Silsurf® A008, Siltec® C-408, BYK 345, 346, 347, 348 and 349, polyether siloxane copolymer TEGO® Wet-260, 270 500, etc. Some amphoteric fluorinated surfactants can also be used such as alkyl betaine fluorosurfactant or alkyl amine oxide fluorosurfactant such as Chemguard S-500 and Chemguard S-111. Other surfactants which may be used include Surfynol PSA 336, Surfynol SE-F, and Surfynol 107L. In embodiments, a cationic surfactant is not used.

Various amounts of surfactant may be used in the aqueous inkjet ink compositions. In embodiments, the surfactant is present in an amount in a range of from 0.01 weight % to 2 weight %. (Here, weight % refers to the (total weight of surfactant)/(total weight of aqueous inkjet ink composition) *100.) If more than one type of surfactant is used, these amounts refer to the total amount of surfactant.

Wax

The aqueous inkjet ink composition may comprise a wax. Illustrative waxes include paraffin waxes, polyethylene waxes, polypropylene waxes, microcrystalline waxes, polyolefin waxes, montan based ester waxes and carnauba waxes. Waxes having a melting point in a range of from 50° C. to 150° C. may be used. Nanoscale (e.g., diameter of 1000 nm or less, 500 nm or less, or 100 nm or less) wax emulsions based on carnauba wax and paraffin wax may be used. Waxes from Michelman may be used (e.g., Michem Lube 103DI, 124, 124P135, 156, 180, 182, 190, 270R, 368, 511, 693, 723, 743, 743P, and 985, and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer 2500, Aquacer 507, Aquacer 513, Aquacer 530, Aquacer 531, Aquacer532, Aquacer 535, Aquacer 537, Aquacer 539, and Aquacer 593. In embodiments, the wax is an anionic nanoscale wax emulsion such as Michem Lube 190.

Various amounts of wax may be used in the aqueous inkjet ink compositions. Generally, however, an amount is selected such that the total solids content of the aqueous inkjet ink composition is from 0.1 weight % to 5 weight %, from 0.1 weight % to 3 weight %, or from 0.1 weight % to 2 weight %. (Here, weight % refers to the (total weight of solids)/(total weight of aqueous inkjet ink composition)*100.)

Additives

Various additives may be used in the aqueous inkjet ink compositions to tune the properties thereof. Suitable additives include one or more of biocides; buffers; and defoamers.

Various amounts of the additives may be used in the aqueous inkjet ink compositions. In embodiments, the additives are present in an amount in a range of from 0.01 weight % to 5 weight %. (Here, weight % refers to the (total weight of additives)/(total weight of aqueous inkjet ink composition)*100.) If more than one type of additive is used, these amounts refer to the total amount of additives.

It is noted that any other exclusions referenced above with respect to the resin particles may be applied to embodiments of the aqueous inkjet ink compositions (as well as to embodiments of the latexes).

In embodiments, the aqueous inkjet ink compositions (as well as the latexes) may also be described as being free of (i.e., not comprising) components such as a boric acid, diglycolic acid, a molecular chelating agent (e.g., ethylenediaminetetraacetic acid (EDTA)), or combinations thereof.

Since the resin/polymer making up the resin particles has already been polymerized, the aqueous inkjet ink compositions (as well as the latexes) themselves are generally not curable and as such, are free of (i.e., does not comprise) an initiator. This does not preclude the presence of a minor amount of unreacted initiator or reacted initiator which may be incorporated into polymer chains of the resin particles. Similarly, the aqueous inkjet ink compositions (as well as the latexes) may be described as being free of (i.e., not comprising) monomers.

In embodiments, an aqueous inkjet ink composition comprises (or consists of) water, a co-medium (e.g., a humectant), pigment particles, resin particles; and optionally, one or more of a surfactant, a wax, a biocide, a buffer, and a defoamer. In any of these embodiments, the components may be selected from any of the co-media (e.g., humectants), pigment particles, resin particles, surfactants, waxes, and additives disclosed herein. In any of these embodiments, amounts of the components may be used as described above.

In embodiments, an aqueous inkjet ink composition comprises (or consists of) water, a co-medium, dispersed pigment particles, and resin particles. The resin particles may comprise (or consist of) a polymerization product of hydrophobic monomers and anionic monomers comprising crosslinkable anionic monomers. A total amount of polymerized crosslinkable anionic monomers in the resin particles may be at least about 1 weight % (including at least about 3 weight %) and a total amount of polymerized anionic monomers in the resin particles may be at least about 15 weight % (including at least about 20 weight %). The dispersed pigment particles may comprise (or consist of) polymer dispersed pigment particles such as polymer dispersed magenta pigment particles, polymer dispersed black pigment particles, or both. The crosslinkable anionic monomers may comprise (or consist of) crosslinkable phosphoric acid monomers such as bis[2-(methacryloyloxy)ethyl] phosphate. The hydrophobic monomers may comprise (or consist of) styrene and the anionic monomers may further comprise monofunctional anionic monomers comprising (or consisting of) methacrylic acid. A reactive surfactant monomer may be included in the polymerization product. An initiator (or a portion thereof) may be incorporated at an end of each polymerization product. The co-medium may comprise 1,2-hexanediol. The co-medium may further comprise (or consist of) propylene glycol, glycerol, hexylene glycol, or combinations thereof. The polymer dispersed pigment particles may be present in the aqueous inkjet ink composition at an amount of from about 4 weight % to about 10 weight % (including from about 4 weight % to about 8 weight %), the resin particles may be present at an amount of from about 1 weight % to about 5 weight % (including from about 1 weight % to about 3 weight %), and the amount of 1,2-hexandiol may be present at an amount of at least about 2 weight %.

The aqueous inkjet ink compositions may be formed by combining the desired components at the desired amounts and mixing. The resin particles may be provided in the latexes described above.

Properties

The aqueous inkjet ink compositions may be characterized by their stabilities. Stability may be quantified by measuring MV particle size using a Nano-flex instrument as described in the Examples, below, from samples (e.g., aqueous inkjet ink compositions) being stored for certain periods of time under certain conditions. Generally, the smaller the change in MV particle size as compared to an initial value, the greater the stability. For purposes of the present disclosure, a sample may be considered to be stable if the MV particle size from a sample stored at 60° C. for 21 days is less than about 200 nm (this encompasses less than about 185 nm and less than about 150 nm) and if the MV particle size from the stored sample has increased by not more than about 50 nm (this encompasses not more than about 40 nm and not more than about 30 nm) as compared to an initial MV particle size. By "initial MV particle size," it is meant the MV particle size measured the same day the sample was prepared, prior to storage. Regarding stability and MV particle size, it is noted that these are properties of the sample being measured as opposed to a particular type of particle within the sample, since some samples may comprise more than one type of particle, e.g., both resin particles and pigment particles. Regardless of whether the MV particle size may be attributed to a particular type of particle, it is desirable to minimize agglomeration of all particles, thus, monitoring MV particle size from samples comprising more than one type of particle provides a useful measure of sample stability.

Inkjet Printing

The aqueous inkjet ink compositions may be used to form printed images. In embodiments, such a method comprises ejecting droplets of any of the disclosed aqueous inkjet ink compositions onto a substrate to form an image thereon. Such a method may further comprise incorporating the aqueous inkjet ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements. Any suitable substrate can be employed.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording substrate and below that of the ink composition in the printing apparatus. Any suitable final recording substrate can be employed.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1: Latex Compositions

As shown in Table 1, below, eight latex samples were prepared, L1-L8. The procedure used for forming each latex sample is illustrated by reference to latex sample L6. First, a reactive surfactant solution of 2.75 grams of a polyoxy ethylene styrenated phenyl ether ammonium sulfate (Hitenol AR-2020) and 77 grams deionized water was prepared by mixing in a 500 mL three neck round bottom flask which served as a reactor. The mixture was then purged with nitrogen for 30 minutes and heated to 80° C. with stirring at 300 RPM.

In a separate flask, the following were mixed and emulsified: 1.75 g of polyoxyethylene styrenated phenyl ether ammonium sulfate (Hitenol AR-2020); 1 g of 1-dodecanethiol (DDT); 4 g bis[2-(methacryloyloxy)ethyl] phosphate (BMEP); 9 g of methacrylic acid (MMA); 26 g of n-butyl acrylate (BuA); 40 g of styrene (Sty), and 32 g deionized water.

An initiator solution was prepared by mixing 0.8 g of ammonium persulfate (APS) initiator in 10 g of deionized water.

Five percent (5%) of the emulsified monomer mixture was fed into the reactor and held for 5 min. Then, 10 g of the initiator solution was added and held for 10 min.

Next, the rest of the emulsified monomer mixture was fed to the reactor slowly over 2.5 hr. When feeding was over, the rest of the initiator solution was added to the reactor and the reaction was allowed to continue for 3 hr. Next, the reactor was cooled to room temperature. The resulting latex sample comprising resin particles polymerized from the monomers of the monomer emulsion was filtered through a mesh and neutralized to pH 8.

A Nano-flex (Microtrac, Inc.) was used to analyze the dimensions of the resin particles in each latex sample. The Nano-flex provides an MV particle size which refers to a mean volume diameter, which is the mean diameter (in nanometers) of the volume distribution of particles in a sample as set forth in the operating manual of the Nano-flex instrument. For latex sample L6, the MV particle size was about 83 nm.

The monomers and amounts used in each latex sample L1-L8 are shown in Table 1, below.

TABLE 1

Latex Compositions.

| Latex Sample | MAA (g) | BuA (g) | Sty (g) | Gly (g)[a] | NaSS (g)[b] | PEG250DA (g)[c] | BMEP (g) | Total Anionic Monomers[d] (wt %) |
|---|---|---|---|---|---|---|---|---|
| L1 | 2.25 | 31 | 42 | 0 | 0 | 0 | 0 | 3.0 |
| L2 | 7 | 29 | 39 | 0 | 0 | 0 | 0 | 9.3 |
| L3 | 12 | 23 | 44 | 0 | 0 | 0.6 | 0 | 15.1 |
| L4 | 6 | 23 | 48 | 2 | 1 | 0.6 | 0 | 8.7 |
| L5 | 18 | 23 | 37 | 0 | 0 | 1 | 0 | 22.5 |
| L6 | 9 | 26 | 40 | 0 | 0 | 0 | 4 | 16.3 |
| L7 | 9 | 24 | 38 | 0 | 0 | 0 | 8 | 21.2 |
| L8 | 15 | 24 | 37 | 0 | 0 | 0 | 3 | 22.5 |

[a]Gly is glycerol formal methacrylate

[b]NaSS is styrene sulfonic acid sodium salt

[c]PEG250DA is poly(ethylene glycol) diacrylate having a molecular weight of 250 g/mol

[d](total amount of anionic monomers)/(total amount of all monomers other than reactive surfactant monomer)*100

Example 2: Particle Stability in Humectant Solutions

In this example, particle stability in two different humectant solutions was evaluated. Specifically, latex samples L5, L6, and L8 were combined with either propylene glycol and water or 1,2-hexanediol and water and stored in a 60° C. oven. As a measure of particle stability, MV particle size was measured at three time points: initial (same day latex sample in humectant solution was prepared, prior to storage), 7 day (7 days after storage), and 21 day (21 days after storage). Generally, it is desirable to minimize changes in PS over time. For purposes of the present disclosure, a sample may be considered to be stable if the 21 day PS less than about 200 nm and has increased by not more than about 50 nm as compared to the initial PS.

The results are shown in Tables 2 and 3, below. Weight percentages of the monomers BMEP and PEG250DA are as described above with respect to Table 1. Weight percentages of the latex are given by (total amount of the resin particles in the latex sample)/(total amount of the resin particles, humectant (propylene glycol or 1,2-hexanediol)) and water)*100. Weight percentages of the humectant are given by (total amount of humectant)/(total amount of the resin particles, humectant, and water)*100. Particle size (PS) is an MV particle size as determined by the Nano-flex as described above.

TABLE 2

| Particle stability in propylene glycol. | | | | | | | |
|---|---|---|---|---|---|---|---|
| Latex Sample | BMEP (wt %) | PEG250DA (wt %) | Latex (wt %) | Propylene Glycol (wt %) | Initial PS (nm) | 7 Day PS (nm) | 21 Day PS (nm) |
| L5 | 0 | 1.3 | 3.2 | 48.3 | 107.2 | 115.7 | 106.2 |
| L6 | 5.0 | 0 | 3.2 | 48.3 | 95.4 | 97.4 | 99.4 |
| L8 | 3.8 | 0 | 3.2 | 48.3 | 100.3 | 94 | 102.5 |

TABLE 3

| Particle stability in 1,2-hexanediol. | | | | | | | |
|---|---|---|---|---|---|---|---|
| Latex Sample | BMEP (wt %) | PEG250DA (wt %) | Latex (wt %) | 1,2-hexanediol (wt %) | Initial PS (nm) | 7 Day PS (nm) | 21 Day PS (nm) |
| L5 | 0 | 1.3 | 3.2 | 48.3 | 250.0 | 885 | — |
| L6 | 5.0 | 0 | 3.2 | 48.3 | 107.5 | 117.9 | 92.4 |
| L8 | 3.8 | 0 | 3.2 | 48.3 | 169.5 | 184.8 | 235.0 |

The results of Table 2 show that particle size is stable for each latex sample L5, L6, L7 in the presence of propylene glycol. However, the results of Table 3 show that particle size is unstable for latex samples L5 and L8 in the presence of 1,2-hexanediol. By contrast, particle size is surprisingly stable for latex sample L6 in 1,2-hexanediol. The resin particles of each latex sample L5, L6, L7 have a total amount of anionic monomers greater than 15 wt % (see Table 1). Although the resin particles of latex sample L6 have a smaller total amount of anionic monomers as compared to those of latex samples L5 and L8, the resin particles of latex sample L6 include a crosslinkable anionic monomer BMEP (versus the crosslinkable, non-anionic monomer PEG250DA of latex sample L5) at a greater amount as compared to the latex sample L8. These features afford latex sample L6 with unexpectedly greater tolerance to 1,2-hexanediol.

Example 3: Particle Stability in Aqueous Inkjet Ink Compositions

In this example, particle stability in various aqueous inkjet ink compositions was evaluated. Specifically, aqueous inkjet ink compositions were prepared by mixing the following: pigment, latex sample, water, and one or more of the humectants, 1,2-hexanediol (HD), propylene glycol (PG), glycerol (G), and hexylene glycol (HG). The aqueous inkjet ink compositions were stored in a 60° C. oven. As a measure of particle stability, MV particle size was measured at three time points: initial (same day aqueous inkjet ink composition was prepared, prior to storage), 7 day (7 days after storage), and 21 day (21 days after storage). Generally, it is desirable to minimize changes in PS over time. As noted above, for purposes of the present disclosure, a sample may be considered to be stable if the 21 day PS less than about 200 nm and has increased by not more than about 50 nm as compared to the initial PS.

The results are shown in Table 4 for a magenta pigment at relatively low loadings. In Table 4, the magenta pigment was a polymer dispersed pigment, Pigment Red 269 ground with an anionic polymer dispersant (a styrene acrylate polymer dispersant commercially available as the PDP series from Kodak). The results are also shown in Table 5 for magenta pigments at relatively high loadings. In Table 5, two magenta pigments were used, the first magenta pigment was a polymer dispersed pigment, Pigment Red 122 ground with the same anionic polymer dispersant noted above and the second magenta pigment was a self-dispersed pigment. CAB-O-JET 480V. The results are also shown in Table 6 for a black pigment. In Table 6, the black pigment was a polymer dispersed pigment, carbon black ground with the same anionic polymer dispersant above. Weight percentages of pigments, latexes, and humectants are determined from equations analogous to those described above with respect to Tables 2 and 3. Particle size (PS) is an MV particle size as determined by the Nano-flex as described above.

TABLE 4

| Magenta Pigment, Low Loading. | | | | | | | | | | |
|---|---|---|---|---|---|---|---|---|---|---|
| Ink Sample | Pigment (wt %) | Latex Sample | Latex (wt %) | HD (wt %) | PG (wt %) | G (wt %) | HG (wt %) | Initial PS (nm) | 7 Day PS (nm) | 21 Day PS (nm) |
| KM1 | 5.20% | None | 0 | 5 | 17 | 3 | 2 | gel | | |
| KM2 | 4.40% | L1 | 4.50% | 3.5 | 19 | 6 | 0 | gel | | |
| KM3 | 4.40% | L2 | 4.50% | 3.5 | 19 | 6 | 0 | 150 | 380 | |
| KM4 | 4.40% | L3 | 4.50% | 3.5 | 19 | 6 | 0 | 138 | 149 | 146 |
| KM5 | 5.20% | L6 | 4.50% | 5 | 17 | 3 | 2 | 161.1 | 146.9 | 147.4 |
| KM6 | 5.20% | L8 | 4.50% | 5 | 17 | 3 | 2 | 133.4 | 139.2 | 137.4 |
| KM7 | 5.00% | L8 | 3.50% | 5 | 21 | 3 | 2 | 142.2 | 149.5 | 171.7 |
| KM8 | 5.00% | L8 | 2.50% | 3 | 23 | 3 | 2 | 161.3 | 149 | 147 |

TABLE 4-continued

| Magenta Pigment, Low Loading. | | | | | | | | | | |
|---|---|---|---|---|---|---|---|---|---|---|
| Ink Sample | Pigment (wt %) | Latex Sample | Latex (wt %) | HD (wt %) | PG (wt %) | G (wt %) | HG (wt %) | Initial PS (nm) | 7 Day PS (nm) | 21 Day PS (nm) |
| KM9 | 5.00% | L6 | 2.50% | 3 | 23 | 3 | 2 | 159.8 | 154.2 | 180.2 |
| KM10 | 5.00% | L6 | 5% | 7 | 21 | 3 | 0 | 152.5 | 138.8 | 145.9 |
| KM11 | 5.00% | L6 | 5% | 7 | 21 | 3 | 0 | 154.8 | 145.3 | 141.7 |
| KM12 | 5.20% | L6 | 6% | 7 | 15.5 | 6 | 0 | 141.5 | 130.9 | 133.9 |
| KM13 | 5.20% | L7 | 6% | 7 | 15.5 | 6 | 0 | 183 | 164.7 | 159.4 |

The results of Table 4 show that ink KM1 (no latex) gelled immediately, and thus, was unstable. Similarly, inks KM2 and KM3 (including latex samples L1, L2 which have resin particles having a total amount of anionic monomers of less than 15 wt %) are also unstable. By contrast, inks KM4-KM13 (including latex samples L6-L8 which have resin particles having a total amount of anionic monomers of greater than 15 wt %) are stable. Moreover, comparing ink KM5 (including latex sample L6 which has resin particles having a total amount of anionic monomers of 16.25 wt %) to ink KM6 (including latex sample L8 which has resin particles having a total amount of anionic monomers of 22.5 wt %), the results of Table 4 show that latex sample L8 affords greater particle stability, even using a relatively large amount of the magenta pigment (which is desirable for color intensity) and even in the presence of hexylene glycol (which is desirable for print quality). Similarly, comparing ink KM9 (including latex sample L6) to ink KM8 (including latex sample L8), the results of Table 4 also show that latex sample L8 affords greater particle stability, even when using a relatively small amount of the latex (which reduces total solids content which is desirable for ink jettability). The results of Table 4, e.g., inks KM10-KM13, further show that larger amounts of the latexes facilitate particle stability, even when using larger amounts of 1,2-hexanediol, which is desirable for ink penetration. This is particularly advantageous since 1,2-hexanediol tends to interfere with particle stability as discussed above with respect to Table 3, above.

TABLE 5

| Magenta Pigments, High Loading. | | | | | | | | | | |
|---|---|---|---|---|---|---|---|---|---|---|
| Ink Sample | Polymer dispersed pigment/Self-dispersed pigment (wt %) | Latex Sample | Latex (wt %) | HD (wt %) | PG (wt %) | G (wt %) | Initial PS (nm) | 3 Day PS (nm) | 7 Day PS (nm) | 21 Day PS (nm) |
| KM14 | 7.5/0 | L6 | 3.5 | 3 | 28 | 3 | 96.4 | 136.4 | 161.5 | 249.1 |
| KM15 | 7.5/0 | L8 | 3.3 | 3 | 25 | 3 | 98.6 | 116.5 | 128.5 | 159.2 |
| KM16 | 6.5/1.0 | L6 | 3.5 | 3 | 28 | 3 | 106.8 | 149.1 | 181.6 | 273.2 |
| KM17 | 6.5/1.5 | L8 | 2.9 | 3 | 26 | 3 | 104.9 | 118.5 | 126 | 152.2 |
| KM18 | 6.5/1.5 | L8 | 3.3 | 3 | 26 | 3 | 113.1 | 121.4 | 129.5 | 149 |
| KM19 | 6.5/1.5 | L6 | 2.9 | 3 | 26 | 3 | 101.3 | 127.5 | 145.4 | 221.4 |
| KM20 | 6.5/1.5 | L6 | 3.3 | 3 | 26 | 3 | 102.3 | 119.3 | 135.8 | 183.2 |

As noted above, higher pigment loading is desirable to improve color intensity. However, higher pigment loading results in a higher total solids content, which can interfere with ink jettability. The results of Table 5 are similar to those of Table 4, showing that latex sample L8 (having resin particles having a total amount of anionic monomers of 22.5 wt %) affords greater particle stability as compared to latex sample L6 (having resin particles having a total amount of anionic monomers of 16.25 wt %). As a result, latex sample L8 is able to provide stability even at a total pigment loading of 8.0 wt % using only 2.9 wt % of the latex (see ink KM17).

TABLE 6

| Black Pigment. | | | | | | | | | | | |
|---|---|---|---|---|---|---|---|---|---|---|---|
| Ink Sample | Pigment (wt %) | Latex Sample | Latex (wt %) | HD (wt %) | PG (wt %) | G (wt %) | Initial PS (nm) | 3 Day PS (nm) | 7 Day PS (nm) | 21 Day PS (nm) |
| KK1 | 5.6 | L4 | 4.5 | 5 | 19 | 8 | 66.1 | 79.5 | 97.6 | 122.0 |
| KK2 | 5.6 | L4 | 4.5 | 5 | 19 | 8 | 64 | 84 | 86.7 | 147.8 |
| KK3 | 5.6 | L6 | 4.7 | 5 | 22 | 4 | 62.3 | 75.5 | 83.2 | 120.5 |
| KK4 | 4.5 | L6 | 2.7 | 3 | 28.6 | 3.2 | 60.7 | 68.1 | 70.5 | 74.2 |
| KK5 | 4.5 | L8 | 2.7 | 3 | 28.6 | 3.2 | 57 | 66.5 | 69.8 | 79.8 |
| KK6 | 5.0 | L6 | 4.00 | 3 | 28.6 | 3.2 | 66.3 | 82.2 | 82.3 | 86.90 |
| KK7 | 5.5 | L6 | 2.68 | 3 | 28.6 | 3.2 | 55.6 | 72.4 | 76.4 | 81.7 |
| KK8 | 5.0 | L8 | 2.17 | 2 | 28.6 | 3 | 56.8 | 63.2 | 64.8 | 76.9 |
| KK9 | 5.1 | L8 | 1.80 | 3 | 25.8 | 6 | 49.8 | 56.3 | 66.7 | 90.9 |
| KD-K51 | 5.5 | L8 | 1.5 | 3 | 25.8 | 6 | 88.9 | 96.3 | 98.6 | 111 |

The results of Table 6 show that inks KK1 and KK2 (including latex sample L4, which has resin particles having a total amount of anionic monomers of less than 9 wt % and no crosslinkable acidic monomer) are unstable. Latex samples L6-L8 (which include resin particles having a total amount of anionic monomers of greater than 15 wt % and include a crosslinkable acidic monomer) afford the inks with greater particle stability, particularly latex sample L8 even at high pigment/low latex loadings (see inks KK9 and KD-K51). Finally, latex sample L8 also affords the inks with desired ink jettability.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

All numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An aqueous inkjet ink composition comprising water, a co-medium, pigment particles, and resin particles, wherein the resin particles comprise a polymerization product of reactants comprising:

one or more types of hydrophobic monomers; and one or more types of anionic monomers comprising one or more types of crosslinkable anionic monomers, wherein the one or more types of crosslinkable anionic monomers comprise one or more types of crosslinkable phosphoric acid monomers, wherein the one or more types of anionic monomers further comprise (meth)acrylic acid monomers, wherein a total amount of polymerized crosslinkable anionic monomers in the resin particles is at least about 4 weight % and a total amount of polymerized crosslinkable anionic monomers and polymerized (meth)acrylic acid monomers in the resin particles is at least about 15 weight %, wherein a weight ratio of a total amount of polymerized crosslinkable anionic monomers in the resin particles to a total amount of polymerized (meth)acrylic acid monomers in the resin particles is less than about 0.5.

2. The aqueous inkjet ink composition of claim 1, wherein the total amount of polymerized crosslinkable anionic monomers and polymerized (meth)acrylic acid monomers in the resin particles is at least about 20 weight %.

3. The aqueous inkjet ink composition of claim 1, wherein the pigment particles comprise dispersed pigment particles.

4. The aqueous inkjet ink composition of claim 3, wherein the dispersed pigment particles comprise polymer dispersed pigment particles.

5. The aqueous inkjet ink composition of claim 4, wherein the polymer dispersed pigment particles comprise polymer dispersed magenta pigment particles, polymer dispersed black pigment particles, or both.

6. The aqueous inkjet ink composition of claim 1, wherein the one or more types of crosslinkable phosphoric acid monomers comprise bis[2-(methacryloyloxy)ethyl] phosphate.

7. The aqueous inkjet ink composition of claim 2, wherein the dispersed pigment particles comprise polymer dispersed pigment particles.

8. The aqueous inkjet ink composition of claim 7, wherein the dispersed pigment particles comprise polymer dispersed magenta pigment particles, polymer dispersed black pigment particles, or both.

9. The aqueous inkjet ink composition of claim 8, wherein the one or more types of crosslinkable phosphoric acid monomers comprise bis[2-(methacryloyloxy)ethyl] phosphate.

10. The aqueous inkjet ink composition of claim 9, wherein the one or more types of hydrophobic monomers comprise styrene and the one or more types of anionic monomers further comprise methacrylic acid.

11. The aqueous inkjet ink composition of claim 10, wherein the co-medium comprises 1,2-hexanediol.

12. The aqueous inkjet ink composition of claim 11, wherein the dispersed pigment particles are present at an amount of from about 4 weight % to about 10 weight %, the resin particles are present at an amount of from about 1 weight % to about 5 weight %, and the amount of 1,2-hexandiol is present at an amount of at least about 2 weight %.

13. The aqueous inkjet ink composition of claim 12, wherein the co-medium further comprises propylene glycol, glycerol, hexylene glycol, or combinations thereof.

14. The aqueous inkjet ink composition of claim 1, wherein the polymerization product of the resin particles comprises poly[(styrene)-ran-(butyl acrylate)-ran-(bis[2-(methacryloyloxy)ethyl]phosphate)-ran-(methacrylic acid)-ran-(anionic ether sulfate).

15. The aqueous inkjet ink composition of claim 14, consisting of the water, the co-medium, the pigment particles, the resin particles, and optionally, one or more of a surfactant, a wax, a biocide, a buffer, and a defoamer.

16. The aqueous inkjet ink composition of claim 13, wherein the polymerization product of the resin particles comprises poly[(styrene)-ran-(butyl acrylate)-ran-(bis[2-(methacryloyloxy)ethyl]phosphate)-ran-(methacrylic acid)-ran-(anionic ether sulfate).

17. The aqueous inkjet ink composition of claim 16, consisting of the water, the co-medium, the pigment particles, the resin particles, and optionally, one or more of a surfactant, a wax, a biocide, a buffer, and a defoamer.

* * * * *